Aug. 17, 1965  P. BASS  3,200,924
SUBSCRIBER'S PREPAYMENT MECHANISM FOR USE
IN SUBSCRIPTION ENTERTAINMENT SYSTEMS
Filed Sept. 16, 1963  3 Sheets-Sheet 3
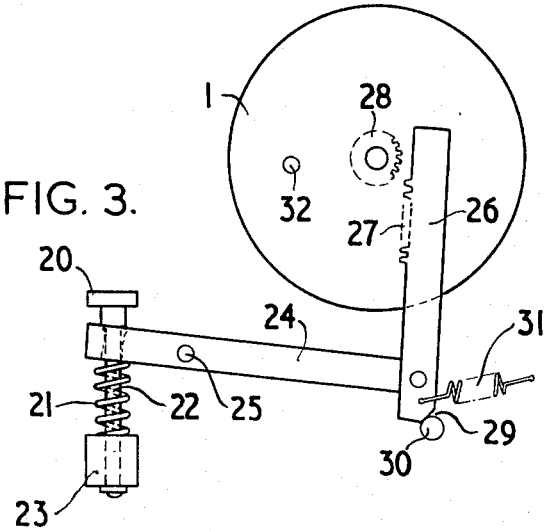
FIG. 3.
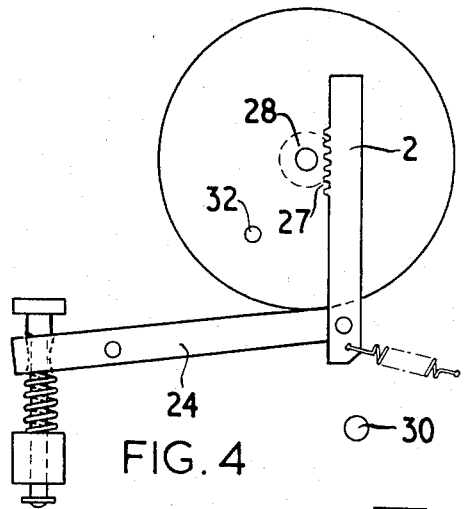
FIG. 4
FIG. 5.
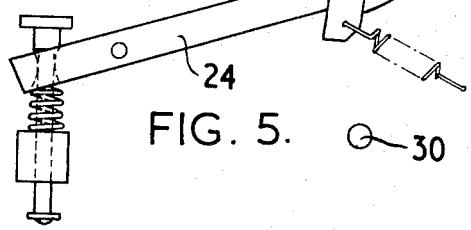
INVENTOR
Patrick Bass
BY *Holcomb, Wetherill & Brisbois*
ATTORNEY United States Patent Office 3,200,924
Patented Aug. 17, 1965

3,200,924
SUBSCRIBER'S PREPAYMENT MECHANISM FOR USE IN SUBSCRIPTION ENTERTAINMENT SYSTEMS
Patrick Bass, London, England, assignor to
R. & R. Research Limited
Filed Sept. 16, 1963, Ser. No. 309,187
Claims priority, application Great Britain, Sept. 21, 1962, 35,982/62
9 Claims. (Cl. 194—1)

This invention relates to a subscription entertainment apparatus for use in systems where television or other entertainment is reproduced on the subscriber's payment of, or undertaking to pay, a specific fee.

A feature of this invention is that the cost of each programme is registered in the subscriber's apparatus prior to his decision to accept it and that the subscriber has at all times a record of his state of credit or debit.

It is an object of the invention to provide facilities for the operator of a subscription entertainment system to send control signals, consisting of price representing signals and resetting signals, in between and not during program transmissions.

Another object of the invention is to provide all subscribers throughout a program transmission with the facility of accepting the remainder of the program, an indication of the price you have to pay for it, and an arrangement whereby he is automatically debited by the amount if he accepts it.

Another object of the invention is to provide each subscriber's receiver with a manually operable acceptance control, which he can operate to receive a program, only if he has sufficient credit standing or is prepared to accept a corresponding debit, and providing the subscriber with a choice of accepting as few or as many programs as he wishes.

A further object of the invention is the provision for automatically setting up a price demand according to the value of program material broadcast, and effectively charging fees for those programmes which the subscribers decide to accept.

A feature of an extension of the invention is the provision for providing automatic charging and debiting facilities in respect of programs transmitted on two or more different channels.

According to one aspect of the present invention there is provided a subscription entertainment apparatus including means to move a price registering member by an amount indicative of a designated price under the influence of received pricing signals, and either a credit state recording member driven in a credit state reducing direction, or a debit state recording member driven in a debit state increasing direction, by an acceptance control mechanism, to permit reproduction of entertainment programmes only when the recorded credit or debit state has been debited by the said price.

According to another aspect of this invention, there is provided a subscription entertainment apparatus comprising, means to reproduce entertainment programmes, a price registering member, means to drive said member in one direction via a one way drive device by an amount indicative of a designated price under the influence of received pricing signals, a credit state or a debit state recording member, an acceptance control mechanism arranged to drive via rack and pinion means both the price registering member in the opposite direction and the credit or the debit state recording member in a debiting direction, and control means to inhibit the reproduction of programmes until the credit or debit state recorded has been thus debited by the price initially registered by the price registering member.

According to one embodiment of the present invention there is provided a subscriber's prepayment mechanism for use in a subscription entertainment system, comprising a first member movable under the control of signals transmitted from a central station over a control channel to record an indication of the price to be charged for a programme, a second member movable in one direction under control of a coin receiving mechanism to display indications of increasing values of credit and movable in the opposite direction by a manually operable mechanism to reduce the amount indicated by said first member the credit shown prior to the operation of said mechanism, said mechanism including means for producing simultaneous movement of said first and second members in said opposite direction until said second member reaches a position at which the price initially shown by said first member has been subtracted from the value of credit displayed by said second member and said first member has been returned to an operating position adjacent to its initial zero position at which it, or a member moving with it, actuates means permitting said programme to be received.

According to an extension of this embodiment of the invention said mechanism includes also a third member movable in said first direction under the control of signals transmitted over a control channel from a central station to record an indication of the price to be charged for an alternative programme, together with a second manually operable mechanism including means for producing simultaneous movement of said second and third members in said opposite directions until said second member reaches a position at which the credit initially displayed thereby has been reduced by the value of the price initially recorded by said third display member and said third display member has been returned to an operative position adjacent to its initial zero position at which it or a member moving with it actuates means permitting said alternative programme to be received.

Preferably a prepayment mechanism according to this embodiment of the invention includes means operating when, during simultaneous movement of said first and second or second and third members, said second member reaches its zero credit position before said first or third member has reached said operating position to prevent further movement of said members.

Preferably also a prepayment mechanism according to this embodiment of the invention includes means operating when said first or said third member reaches said operating position for preventing further movement of said second member in said opposite direction.

A prepayment mechanism according to the invention preferably includes means actuated by signals transmitted over a central channel from said central station for causing said first or third member to return from said operating position to said initial position.

An embodiment of the invention will now be described by way of example only with reference to the accompanying drawings comprising FIGURES 1 to 5 of which:

FIGURES 3, 4 and 5 are diagrams illustrating the action of the mechanism described in relation to FIGURE 2.

Figure 1:
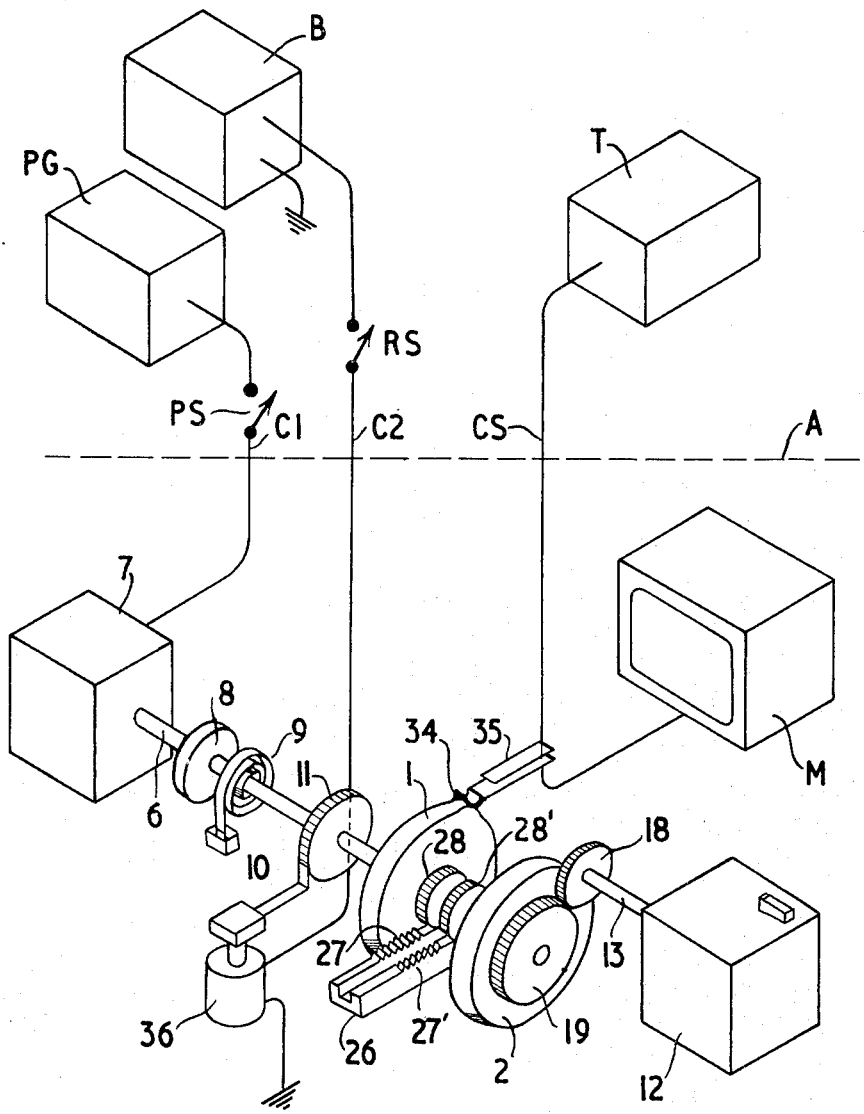
FIGURE 1 is a greatly simplified schematic representation of a central station and one subscriber's station in a subscription entertainment system of the kind to which the present invention relates which in this case is a subscription television system.

In FIGURE 1 that portion of the diagram above broken line A represents the apparatus at a central station of a subscription television system, while the portion of the diagram below line A represents the apparatus at a single subscriber's station.

The apparatus at the central station includes a source of television programmes T, such for example as a normal film-scanning suite well known in the art. Signals developed by this source are distributed over a network, of which a single branch only is represented by a wire CS, to all the subscribers' stations. The central station also includes a pulse signal generator PG the output of which is fed by way of a pulse switch PS and a first control channel C1 to the subscribers' stations, and also a direct-current source B the output from which passes under the control of a switch RS and a second control channel C2 to each subscriber's station.

It will be appreciated by those skilled in the art that in practice signal channel CS and control channels C1 and C2 may be constituted by a single pair of conductors. The means whereby such a combination of channels may be effected are well known.

At the subscriber's station the signals transmitted over channel CS are fed to a receiver M by which the programme may be reproduced. The mechanism according to the invention for ensuring prepayment of a fee which may vary from one programme to the next consists basically of a first display member 1, in this case a drum of which the edge carries notations representing programme prices of which one only will in operation be visible to the subscriber through a window in the casing enclosing the mechanism. To prevent confusion in the drawing these notations are omitted.

When a programme is about to commence switch PS at the central station is closed and a predetermined number of pulses is transmitted over control channel C1 to a stepping motor 7 at the subscriber's station. Stepping motor 7 may be any suitable known device capable of responding to the receipt of a pulse train by causing an output shaft 6 to rotate through an angular distance directly related to the number of pulses in the train. As an example of such a device there may be mentioned the uniselector drive mechanism used in automatic telephony.

Through the intermediary of unidirectional drive device 8 motor 7 drives shaft 6 upon which drum 1 is mounted and thus causes the drum to rotate, against the action of a spiral spring 9, until an appropriate price is exhibited to the subscriber. Reverse rotation of shaft 6 is at this time prevented by a pawl 10 engaging a ratchet wheel 11 on shaft 6.

If the subscriber decides to accept the offered programme, he inserts coins to at least the value of the displayed price in a coinbox 12, which is arranged to rotate an output shaft 13 carrying a pinion 18 through an angle bearing an appropriate direct relation to the value of the coins inserted. Pinion 18 engages a gear 19 which is secured to drum 2, which is thus turned so as to display to the subscriber a notation indicating the credit which has been established. The actual acceptance of the programme is effected by causing an appropriate mechanism to rotate drums 1 and 2 simultaneously through equal angles until the price drum 1 is returned to a position in which a notation PAID is displayed to the subscriber and the credit notation shown by drum 2 is reduced from its initial value by the price of the programme. A convenient method of effecting the necessary rotation of drums 1 and 2 is to provide a member 26 carrying racks 27, 27' which as member 26 is moved towards the drums engage with gears 28, 28' carried respectively on drums 1 and 2.

When drum 1 reaches the PAID position a cam 34, which is in this case formed on drum 1 itself, closes a pair of contacts 35 thus connecting the signal received on channel CS to the receiver M. The programme is now reproduced by the receiver.

At the end of the programme switch RS at the central station is closed to allow a direct current to flow from source B by way of channel C2 to an electro magnet 36 which is arranged when energised to cause pawl 10 to be disengaged from ratchet wheel 11. Drum 1 then returns to its initial position under the influence of spring 9, so that contacts 35 open and disconnect receiver M from the signal channel CS.

This restoration of drum 1 to its initial position will also take place in cases where the programme was not accepted, leaving the mechanism in its initial condition ready for the price of the succeeding programme to be set up.

It will be appreciated that the foregoing description covers the general operation only of a prepayment mechanism according to the invention and that certain features necessary in practice have been omitted in the interest of clarity. A complete description of the operation of an embodiment of such a mechanism is given below with reference to FIGURES 2–5.

It should be noted, however, that the specific embodiments herein described are not to be construed as limiting the scope of the invention. It will be obvious that alternative forms of many of the elements constituting the mechanism are possible, though in some cases less advantageous.

It may in practice be found advantageous to use contacts 35 to control a relay which performs the actual switching operation upon the signal channel.

Figure 2:
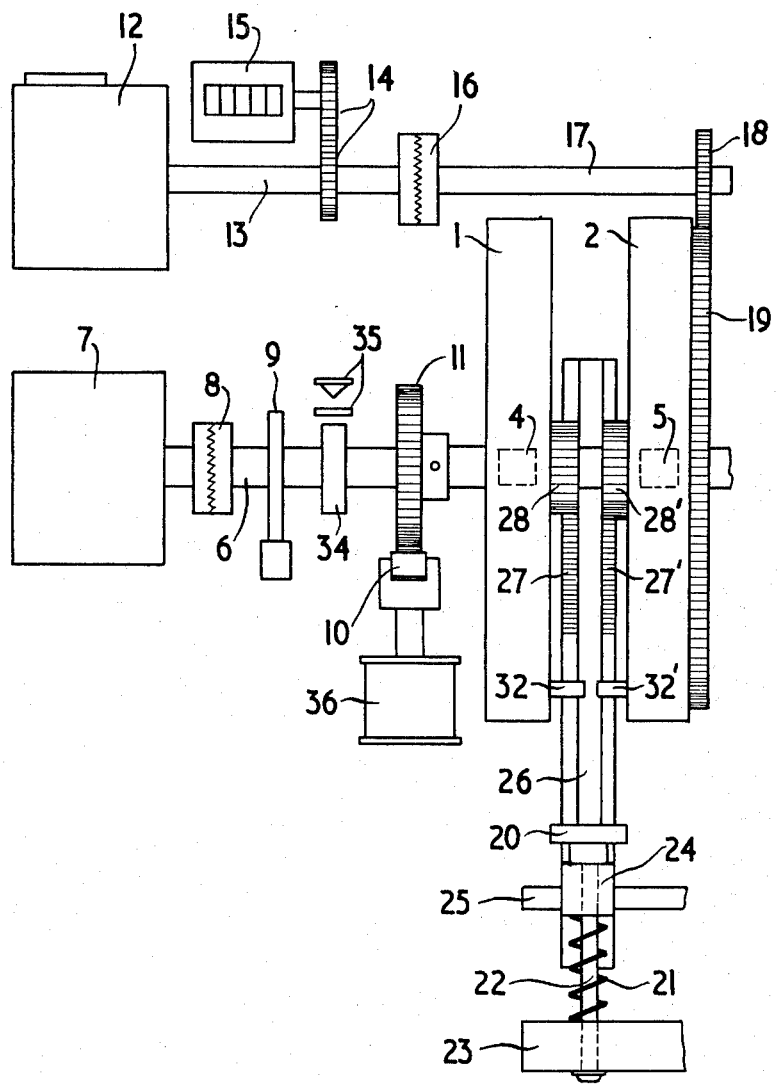
FIGURE 2 is a diagram illustrating details of a prefered embodiment of a subscriber's prepayment mechanism according to the present invention.

In FIGURE 2 is shown a mechanism comprising two revolvable drums 1, 2 of which when the mechanism is enclosed in its casing, portions only are visible through respective windows of which the positions are indicated by broken line rectangles 4 and 5. In practice drum 1 carries price designations of which one only can be seen through the respective window to inform the customer of the price charged for a programme, while drum 2 will carry credit designations of which only that which at any time represents the customer's credit will be visible.

At the commencement of a new programme a stepping motor 7, which is an electromagnetic device which when energized produces a definite rotation of an output shaft, is arranged to be energised a number of times appropriate to the price to be charged by way of a unidirectional drive device 8, which may as illustrated be a multiple ratchet device, motor 7 produces a rotation of a shaft 6 upon which drum 1 is mounted such that drum 1 is moved from its position of rest, against the action of a spiral spring 9, in which an "0" is displayed in window 4, to a position in which the appropriate price is displayed. Reverse rotation of drum 1 at this time is prevented by the action of a pawl 10 engaging a ratchet wheel 11.

If it is desired to receive this programme, the subscriber places coins to at least the value of the price shown in a coinbox 12 which may be on any known type in which an output shaft is caused to rotate an amount proportional to the value of the coins inserted.

Output shaft 13 of coinbox 12 is conveniently coupled by gears 14 to a counter 15 which displays an indication of the total credit registered by the coinbox. Shaft 13 is also coupled by way of a unidirectional drive device, such as a multiple ratchet 16, to a further shaft 17 which carries a pinion 18. This pinion engages a gear 19 which is secured to drum 2. This drum, which is assumed to be initially in the "zero credit" position, is therefore turned so that there is displayed in window 5 a notation representing the value of the coins deposited in coinbox 12.

It is now possible for the subscriber to accept the offered programme. This operation is performed by depressing a programme acceptance button 20, the actions produced by which are best understood by reference to FIGURES 2 to 4.

Acceptance button 20 is depressed against the action of a coil spring 21 which surrounds the stalk 22 by which button 20 is slidably mounted to a supporting bar 23 forming part of the framework of the mechanism, thus moving one end of a lever 24 of which the fulcrum is formed by a shaft 25 mounted in the framework. The further end of lever 24 thus rises, lifting a channel-section member 26 which has portions 27, 27' of its edges formed into racks which engage with pinions 28, 28' mounted on the shafts of drums 1 and 2 respectively. In its position of rest, a slant face 29 on channel member 26 engages a bar 30 which tilts member 26 against the action of a tension spring 31 so that racks 27, 27' are disengaged from pinions 28, 28'. When button 20 is depressed the tail of member 26 is disengaged from bar 30 so that racks 27, 27' engage pinions 28, 28' and as member 26 rises these pinions and the associated drums will rotate through equal angles as illustrated by FIGURE 3 in the direction resulting in decreasing notations appearing in windows 4, 5, until drum 1 reaches a position at which the word PAID appears in window 4. In this position of drum 1 a pin 32 affixed to the drum engages a member 26 and tilts racks 27, 27' out of engagement with pinions 28, 28'.

As the drum 1 reaches the PAID position a cam 34 mounted upon shaft 6 closes a pair of contacts 35 which result in the programme being received. These contacts may also control known circuit means for reporting to a central station the fact that a subscriber has accepted the programme and additionally to operate central billing means.

If it should happen that the credit established and shown on drum 2 is less than the cost of the selected programme, then as drum 2 reaches the zero credit position a pin 32' on drum 2 engages member 26 likewise disengaging racks 27, 27' from pinions 28, 28'.

At the end of a programme an electro magnet 36 is energised to release pawl 10 from ratchet wheel 11, so that drum 1 is allowed to return, from its PAID position if the programme was accepted and otherwise from the price position to which it was set prior to the start of the programme, to its zero position under the action of spring 9. Cam 34 then allows contacts 35 to open and receipt of the programme ceases.

The apparatus so far described is readily modified to permit selection between programmes transmitted on two channels. To this end it is only necessary to provide an additional drum similar to drum 1, together with its associated apparatus, which may be arranged on the side of drum 2 remote from drum 1, so that with the exception of gear 19 the assembly becomes symmetrical about the central plane of drum 2.

In modification of the apparatus described, the coin box there used to establish credit is replaced by a totalling counter arranged to record all movements of the pricing drum made under the control of the acceptance button. In this manner the counter will record the total of all prices of accepted programmes. Since similar movements of the drum may take place other than as a result of actuation of the programme acceptance button, suitable means must be provided to prevent the unwanted operation of the totalling counter at these times.

In apparatus according to an alternative embodiment of the invention the apparatus already described is modified so that operation of a programme acceptance button causes the pricing drum to continue to rotate in the direction in which it was previously advanced by the motor to set the price until the PAID position is reached. Consideration of the operation will show that when this method of working is adopted, the pricing must be effected by transmitting pricing pulses of which the number decreases in proportion to the price to be charged, or by an equivalent price control operation, since to set a given price the drum must be moved through one revolution *less* the portion of a revolution representing the price. An advantage of this modified arrangement is that the arrangements for permitting rotation of the drum on acceptance of a programme are considerably simplified.

In the embodiments described, the programme price is displayed by a member moving under the influence of received pricing signals. This is very desirable, but not essential; the only necessity is that the price should be registered and used if accepted to record a debit. The subscriber may be informed of prices by loudspeaker announcements or other means.

"Entertainment" as used throughout the specification should be interpreted broadly to include within its meaning news, informational, educational broadcasts, discussions, speeches and the like.

I claim:

1. A subscription entertainment apparatus comprising means to receive pricing signal denoting program prices, a price registering member, means to move said price registering member from an initial position to a position determined by the received pricing signal and registrative of a specific program price, an account state recording member, a manually operative acceptance control drivingly coupled to both said members, whereby to move said price registering member to said paid position and to debit the account state record by the price of the program accepted, switch means coupled to said price registering member to close an electrical path when and only when said price registering member is in its paid position, thus enabling reproduction of said program, a coin box coupled to said account state recording member, to move this member in a credit direction on coin depositions, and means to inhibit the driving action of said acceptance control on the account state record standing at insufficient credit.

2. A subscription entertainment apparatus comprising means to receive pricing signal denoting program prices, a price registering member, means to move said price registering member from an initial position to a position determined by the received pricing signal and registrative of a specific program price, an account state recording member, a manually operative acceptance control drivingly coupled to both said members, whereby to move said price registering member to said paid position and to debit the account state record by the price of the program accepted, switch means coupled to said price registering member to close an electrical path when and only when said price registering member is in its paid position, thus enabling reproduction of said program, rack means carried by said acceptance control, a first pinion coupling said rack means to said price registering member, a second pinion coupling said rack means to said account state recording member and means to decouple the drive from said acceptance control to said members on the return stroke of said control.

3. A subscription entertainment apparatus comprising a price registering member having an initial position, a plurality of price registrative positions, and a PAID position, switch means to energize a program reproducer only when said member is in said PAID position, input terminals for pricing signals, means coupled to said input terminals to drive said price registering member to a position determined by incoming pricing signals, an account state recording member and acceptance control means drivingly coupled to both said members, in such manner as to drive the price registering member to its PAID position, and simultaneously drive the account state member in a debiting direction by the amount of the price registered, coin box means having an output drivingly coupled to the account state recording member for its driving in a crediting direction, inhibiting means to condition said acceptance control, whereby said price registering member may be driven towards said PAID position only on said account state record standing at a designated credit, input terminals for reset signals, and means responsive to said reset signals to reset said price registering member to its initial position.

4. Subscription entertainment apparatus comprising a price registering and indicating member having an initial orientation, a pluralilty of price registering and indicating orientations, and a PAID orientation, switch means closed by said price registering and indicating member only when in said PAID orientation, to permit program reproducing means to function, means to move said pricing member from its initial orientation to an orientation registering and indicating price in accordance with incoming pricing signals, an account state recording member, mounted coaxially with but independently rotatable with respect to said pricing member, having a plurality of orientations registrative of and indicative of prevailing debit/credit conditions, a manually operable acceptance control, first and second parallel racks carried by said control, first and second pinions to engage respective ones of said racks, and coaxially mounted with said members, said first rack and pinion providing a coupling means whereby said acceptance control on its operative stroke but not on its return stroke drives said pricing member towards its PAID position, and said second rack and pinion providing coupling means whereby said acceptance control on its operative stroke but not on its return stroke drives said account member in a debiting direction, ratchet means normally operative to hold said pricing member in any of said price registrative orientations to which it may have moved under the influence of said pricing signals, spring means to bias the price registrative member towards its initial position, and means responsive to an incoming resetting signal to render said ratchet means temporarily inoperative for the return of said price registering member to its initial orientation under the bias of said spring means.

5. An apparatus according to claim 4 comprising coin box means having an output shaft rotated by coin insertions, and means to communicate rotations of said output shaft to rotate said account state recording member in its crediting direction.

6. Apparatus according to claim 5 comprising means actuated by said account state record member assuming an orientation corresponding to a state of insufficient credit, to disengage both said racks from said pinions.

7. Apparatus according to claim 4 comprising means actuated by said price registering member when in its PAID orientation to disengage both said racks from said pinions.

8. A subscription entertainment system comprising means to transmit program signals in respect of a pay program, and means to transmit, between pay program transmissions, a resetting signal in respect of the preceding program and a pricing signal in respect of the succeeding program, and subscribers' receiving apparatus comprising means to reproduce programs from said program signals, price registering mechanism having a pricing member drivable from an initial position to one of a plurality of possible price registrative positions in response to said pricing signal means to hold an energizing electrical path for said reproducing means open when said price registering member is at any of said price registrative positions, an acceptance control operable at will by the subscriber to drive said price registering member to a PAID position, defined by its closing of said electrical path, thereby permitting a programme reproduction, an account state recording member driven by said acceptance control simultaneously with its drive of said price registering member, whereby the price of an accepted program is debited by said accounting member, means to bias said price registering member towards its initial position, means to hold said price registering member in positions other than said initial position against said biasing means, and means to disable said holding means on reception of said resetting signal, thus allowing the return of said price registering member to its initial position whether a set program is accepted or not.

9. A system according to claim 8, comprising payment collecting means, means coupling said payment collecting means to said account state record member to move it in a crediting direction, and means to disable the drive by said acceptance control when the account state recording member registers that credit is exhausted.

References Cited by the Examiner
UNITED STATES PATENTS

| | | | |
|---|---|---|---|
| 2,914,159 | 11/59 | Burns | 194—1 |
| 2,966,980 | 1/61 | Nyberg | 194—1 |
| 2,996,163 | 8/61 | Baker | 194—37 |

LOUIS J. DEMBO, *Primary Examiner.*

ERNEST A. FALLER, SAMUEL F. COLEMAN,
*Examiners.*